Dec. 2, 1969  H. E. BALSIGER  3,481,085
DUPLEX VALVE GRINDER

Filed July 8, 1966  5 Sheets-Sheet 1

INVENTOR
HAROLD E. BALSIGER
BY
Mason, Porter, Diller & Brown
ATTORNEY

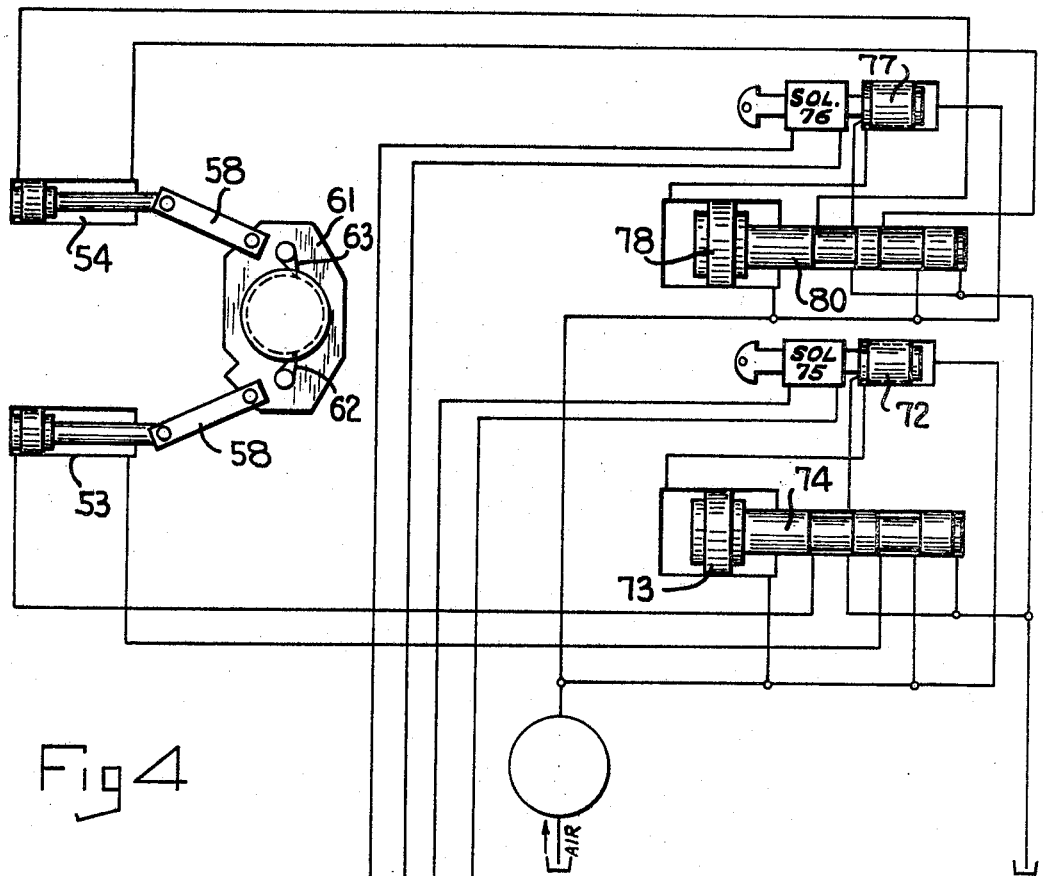
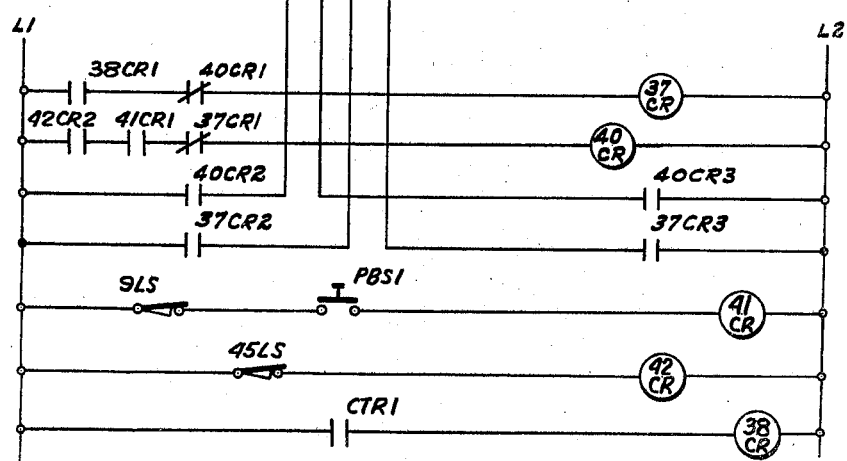
Fig 4
INVENTOR
HAROLD E. BALSIGER
BY
Mason, Porter, Diller & Brown
ATTORNEY Dec. 2, 1969  H. E. BALSIGER  3,481,085
DUPLEX VALVE GRINDER Filed July 8, 1966  5 Sheets-Sheet 5

INVENTOR
HAROLD E. BALSIGER

BY Mason, Porter, Diller & Brown
ATTORNEY

United States Patent Office 3,481,085
Patented Dec. 2, 1969

3,481,085
DUPLEX VALVE GRINDER
Harold E. Balsiger, Waynesboro, Pa., assignor, by mesne assignments, to Landis Tool Company, Waynesboro, Pa., a corporation of Delaware
Filed July 8, 1966, Ser. No. 563,878
Int. Cl. B24b 5/00, 49/00, 51/00
U.S. Cl. 51—105     11 Claims

ABSTRACT OF THE DISCLOSURE

A machine for simultaneously grinding at least two workpieces having conical surfaces. The grinding wheel is pivotally mounted with means to shift the axis of the grinding wheel relative to the workpieces so that the angular relationship between the grinding wheel face and the conical surfaces of the workpieces will remain substantially constant even though the diameter of the grinding wheel is being decreased due to wear and dressing.

---

This invention relates in general to new and useful improvements in grinding machines, and more particularly to a novel grinding machine for grinding the faces or seating surfaces of automotive-type poppet valves.

This invention particularly relates to a grinding machine for simultaneously grinding at least two such automotive-type poppet valves.

In the machines for grinding valves one at a time the angular relation between the valve face or seating surface and the grinding wheel remains constant for all diameters of the grinding wheel because the plane through the axis of the grinding wheel also passes through the axis of the valve. Prior to this invention, the faces or seating surfaces of valves have always been ground one at a time in this manner.

When two or more valves are ground at the same time by a single grinding wheel, the valves must be supported in a position in which neither valve is in a radial plane of the grinding wheel axis. With this arrangement, as the radius of the grinding wheel decreases due to wear and dressing, the angular relation between the face of the grinding wheels and the seating surfaces of the valves also changes.

It is, therefore, an object of this invention to provide means for maintaining the proper relation between the face of the grinding wheel and the seating surfaces of the two valves which will result in the grinding of the seating surfaces at the proper predetermined angle.

Another object of this invention is to provide means for automatically effecting angular adjustment of the grinding wheel relative to supports for valves at intervals determined by the rate of wear of the grinding wheel whereby the angle of the seating surface ground on the various valves remains constant.

A further object of this invention is to provide means for effecting angular adjustment of the grinding wheel after a predetermined number of dressing operations.

With the above and other objects in view that will hereinafter appear, the nature of the invention will be more clearly understood by reference to the following detailed description, the appended claims and the several views illustrated in the accompanying drawings.

In the drawings:

FIGURE 4 is a diagrammatic showing of the hydraulic system and the electrical circuit of the grinding machine.

Figure 1:
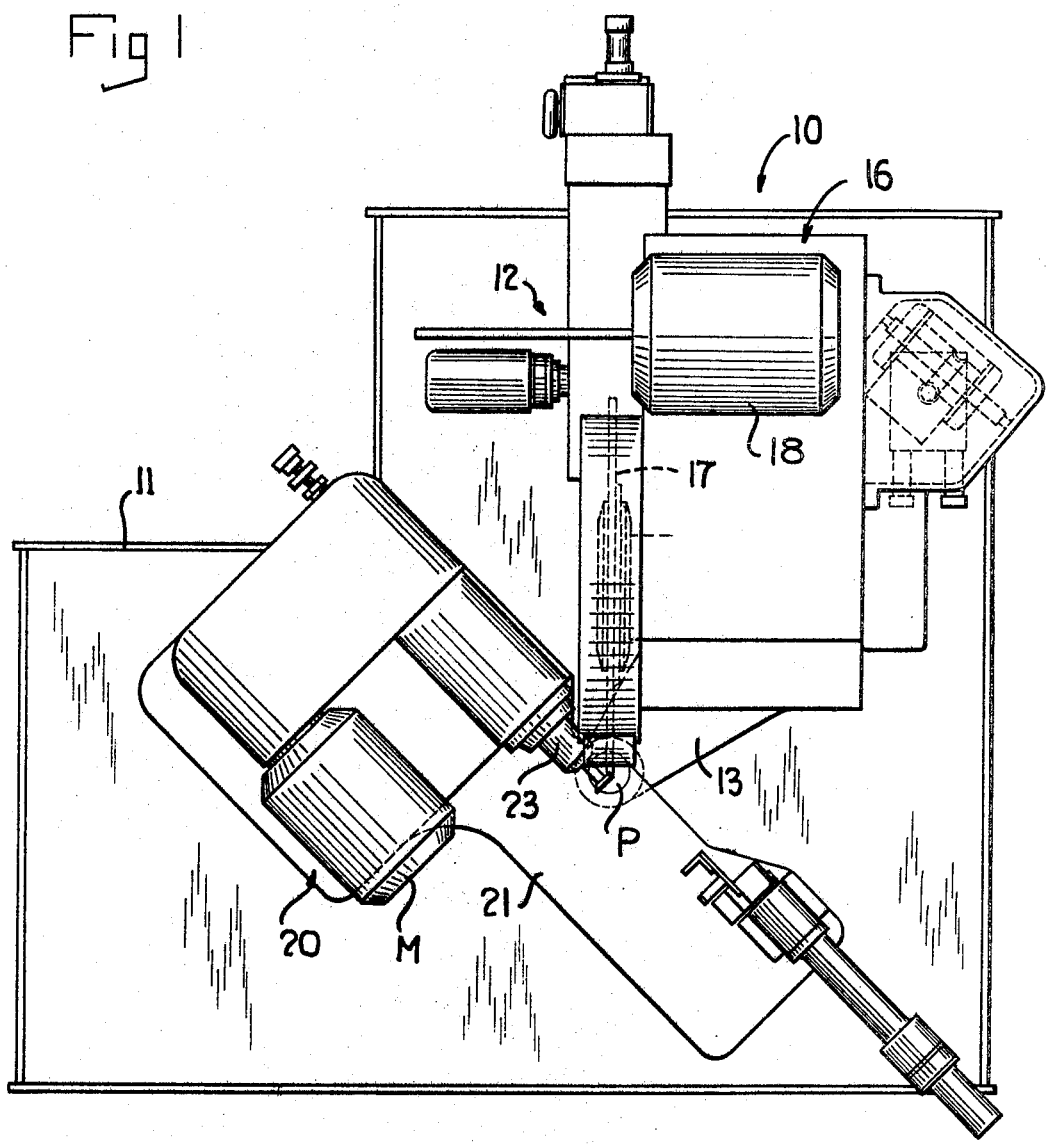
FIGURE 1 is a plan view of the grinding machine.

Referring now to the drawings in detail, it will be seen that there is illustrated in FIGURE 1 the over-all details of the grinding machine of this invention, the grinding machine being generally referred to by the numeral 10. As is customary, the grinding machine 10 includes a rigid bed 11 on which there is mounted a grinding wheel assembly which is generally referred to by the numeral 12. The grinding wheel assembly includes a base 13 which is seated on the bed 11 for angular adjustment about a pivot pin P. Suitable means are provided for adjusting the angular position of the base 13 and maintaining the base 13 in that angular position.

The grinding wheel assembly 12 includes a grinding wheel support, which support is generally referred to by the numeral 16. The grinding wheel support supports a vertically disposed grinding wheel 17. The grinding wheel 17 is suitably rotated at a predetermined speed by means of an electric motor 18.

It is to be understood that there are provided conventional means for effecting the reciprocation of the grinding wheel support 16 as is required in the grinding operation. Also, there will be provided dressing means for periodically dressing the grinding wheel as it wears unevenly. These are conventional, and not specifically illustrated nor described here.

There is also carried by the bed 11 a work support assembly which is generally referred to by the numeral 20. The work support assembly 20 includes a base 21 which is mounted on the bed for movement along an axis disposed at a predetermined angle. The adjustment of the base 21 is accomplished by means of a suitable adjusting mechanism which is conventional and not described in detail here. The work support assembly 20, which may be broadly referred to as a headstock, includes a pair of parallel, vertically spaced work supporting members 23 which are equally spaced above and below a horizontal plane passing through the axis of the grinding wheel. The headstock 20 includes a motor M which is suitably coupled to the work supporting members 23 for effecting the rotation of workpieces, such as valves, etc.

Figure 5:
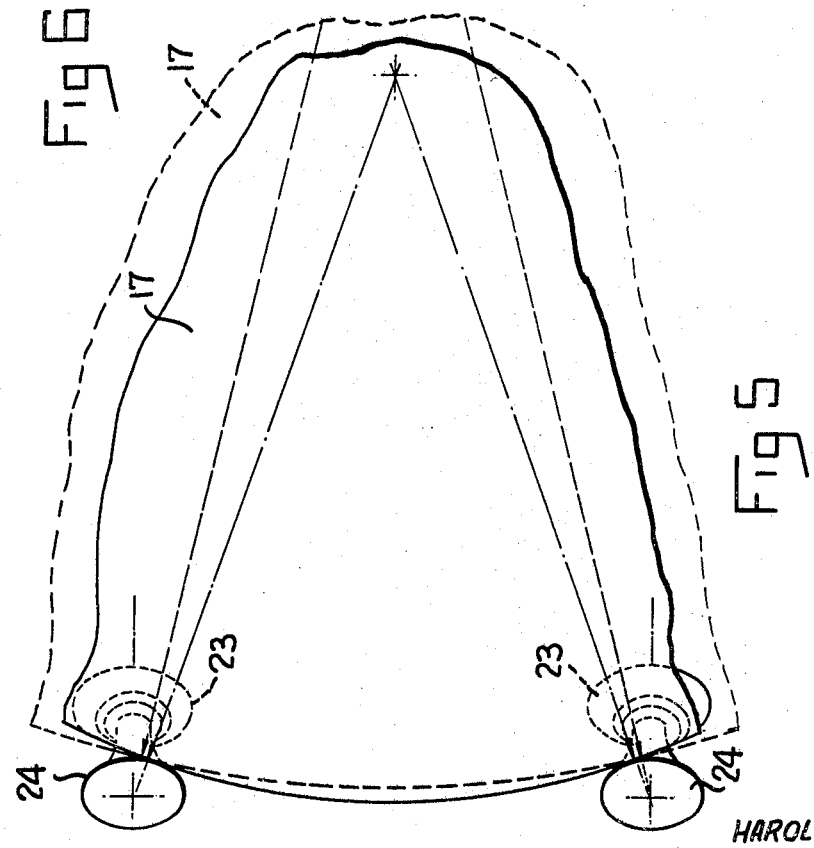
FIGURE 5 is a schematic elevational view showing generally the relationship of two valves being ground with respect to the grinding wheel, there being illustrated two different diameters of grinding wheels.

Reference is now made to the schematic showing of FIGURE 5. It will be seen that the two work supporting members 23 carry automotive-type poppet valves 24 which are to have the faces or seating surfaces thereof ground by the grinding wheel 17. It will be readily apparent from FIGURE 5 that as the grinding wheel 17 becomes of a lesser diameter, the lines of contact between the valves and the face of the grinding wheel come closer together. This results in a change in the angle of the face or seating surface being ground on the valves 24 if no compensation is made for the reduction in diameter of the grinding wheel.

Figure 6:
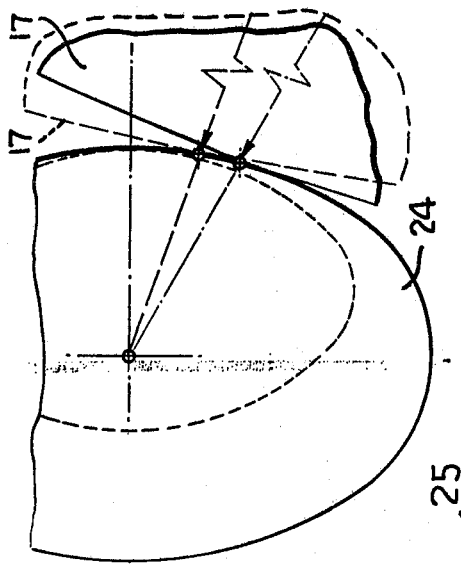
FIGURE 6 is an enlarged fragmentary schematic view showing greater proportions of the relationship of a valve to two grinding wheels of different diameters.
Figure 7:
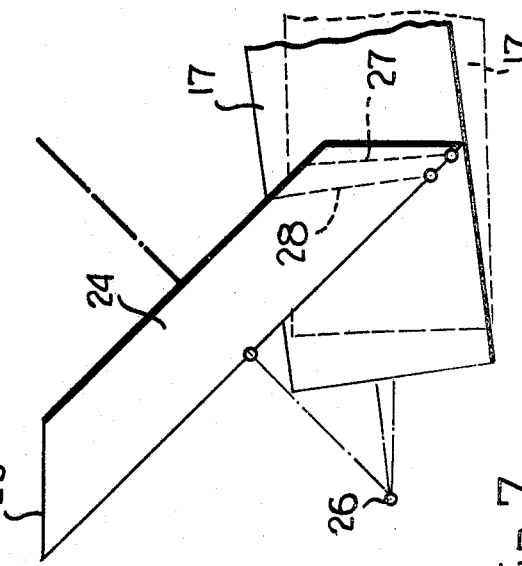
FIGURE 7 is an enlarged schematic view in plan showing how the line of contact between a valve seating surface and the face of the grinding wheel varies as the diameter of the grinding wheel varies.

Referring now to FIGURES 6 and 7 in particular, it will be more apparent that as the diameter of the grinding wheel 17 reduces, the angular relationship between the face of the grinding wheel and the seating surface of the valve 24 will vary. However, as is shown in FIGURE 7, by changing the angular relationship of the grinding wheel with respect to the axis of the valve 24, within a limited range of diameters of grinding wheels, the angle of the seating surface 25 of the valve 24 will remain constant.

In order to further explain the change in angular relationship between the face of the grinding wheel and the seating surface of a valve being ground as the diameter of the grinding wheel reduces, it is pointed out that with a grinding wheel of a fixed diameter, when the axis of the valve is in the same plane as the axis of the grinding wheel, the line of contact between the seating surface 25 of the valve and the face of the grinding wheel is parallel to a vertical projection of the seating surface. However, as the axis of the valve is displaced vertically above a horizontal plane passing through the axis of the vertically disposed grinding wheel, the line of contact between the valve seating surface and the face of the grinding wheel will move downwardly. If the angular relationship between the axis of the valve and the axis of the grinding wheel remains constant, the angle of the seating surface of the valve will gradually change. This same change in conditions will occur when the valve is held stationary and the diameter of the grinding wheel is reduced, as occurs due to wear and dressing.

It has been foun that this undesired change in the angle of the seating surface of the valve can be avoided for a grinding wheel diameter within a limited range by changing the angular relationship of the axis of the grinding wheel in a horizontal plane in accordance with the reduction in the diameter of the grinding wheel.

It has been found that the axis about which the grinding wheel should be adjusted is one which lies in a plane passing through the axes of the work supporting members 23 along the line of intersection of that plane with a plane lying within the confines of the grinding wheel and disposed normal to the axis thereof. In FIGURE 7 the axis of the pivot P is identified by the numeral 26.

When the grinding wheel 17 is of a maximum diameter, as shown in FIGURES 6 and 7 by dotted lines, the line of contact between the face of the grinding wheel and the seating surface 25 of the valve 24 will be along the line 27. However, when the diameter of the grinding wheel 17 reduces and the grinding wheel is of a size shown schematically by the grinding wheel 17 in solid lines, the line of contact between the face of the grinding wheel and the seating surface of the valve will move generally towards the axis 26 and when the grinding wheel is properly adjusted angularly about the axis 26, the line of contact, which is identified by the numeral 28, will be at a different angle from the line of contact 27. However, in both instances the angle of the seating surface 25 will be the predetermined angle.

From the foregoing, it will be readily apparent that in order to maintain the proper angle of the seating surfaces 25 on the valves, it is, therefore, necessary to change the angular position of the grinding wheel periodically. One way of determining when the angular position of the grinding wheel is to be changed, is by the number of times the grinding wheel is dressed, since the production time of the grinding wheel is due primarily to dressing. Therefore, after one, two or any predetermined number of dressing operations, the grinding wheel support is swiveled by an increment design to compensate for its reduction in diameter. This adjustment of the grinding wheel serves to maintain a relationship between the face of the grinding wheel and the seating surfaces of the valves, whereby the seating surface is ground flat at the predetermined angle well within specified limits.

Figure 2:
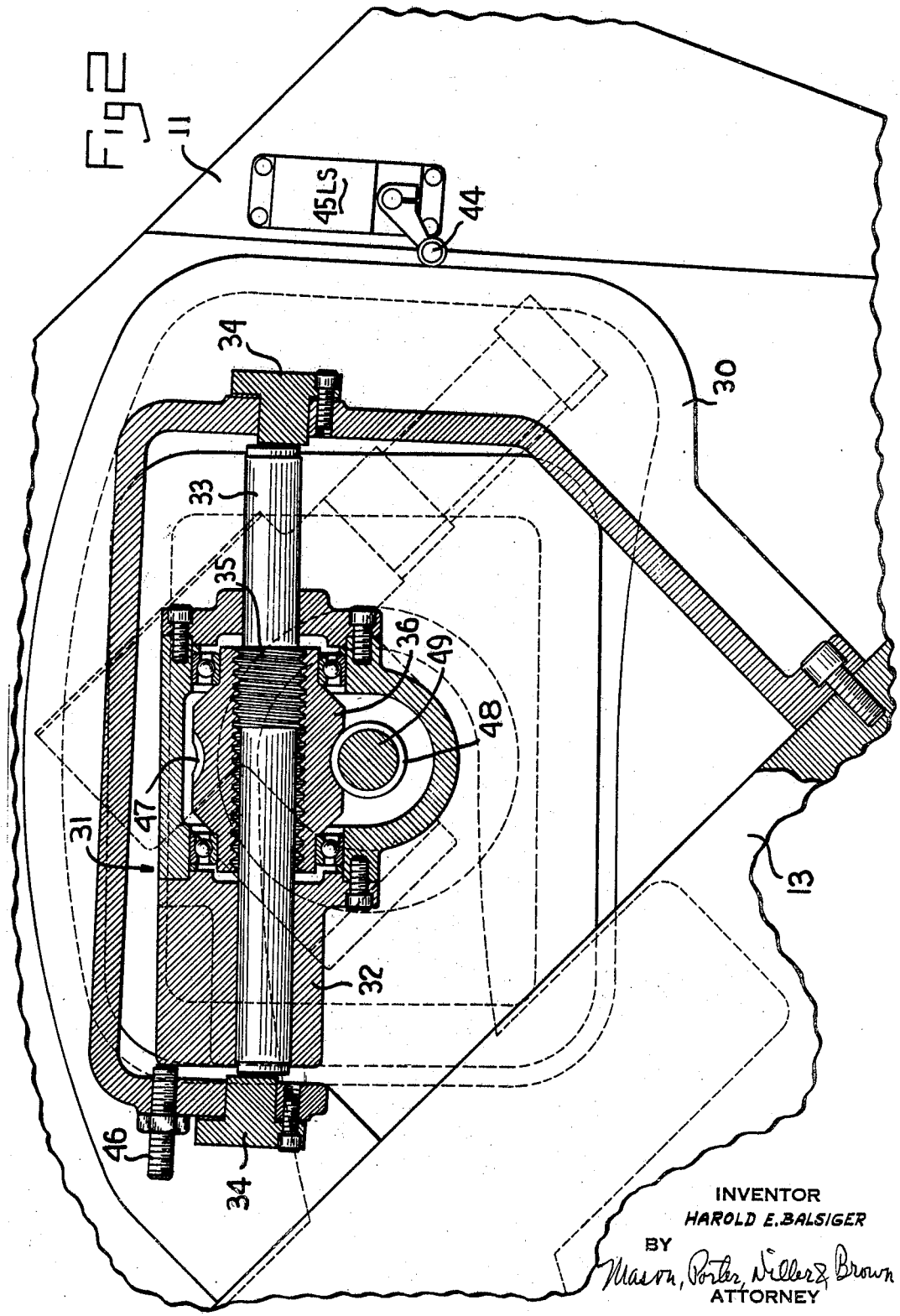
FIGURE 2 is an enlarged fragmentary plan view, with parts broken away and shown in section, of the mechanism for effecting the angular adjustment of the support for the grinding wheel.

Referring now to FIGURE 2 in particular, it will be seen that there is illustrated the means for maintaining and adjusting the angular position of the grinding wheel 17. A suitable housing or bracket 30 is rigidly secured to the base 13 of the wheel support and encloses an actuating assembly, generally referred to by the numeral 31, mounted on the bed 11. The actuating assembly 31 includes a fixed support 32 in which is slidably mounted an actuating bar 33. The opposite ends of the actuating bar 33 are engaged with inserts 34 removably carried by the bracket 30. The actuating bar 33 has a threaded intermediate portion 35 which is engaged by a nut 36 suitably journalled for rotation within the support 32. Inasmuch as the support 32 is fixed to the bed 11, it will be seen that movement of the actuating bar 33 relative to the support 32 will result in a like shifting of the bracket 30 with respect to the support and an associated change in the angular position of the grinding wheel 17.

It is to be noted that the extreme movement of the bracket 30 to the right results in the engagement of the bracket 30 with an actuator 44 of a limit switch 45LS. At the same time, movement of the bracket 30 to the right is limited by means of an adjustable stop screw 46 carried by the bracket 30 with the support 32.

It is to be noted that the nut 36 is provided with external teeth 47 for engaging a worm gear 48. The worm gear is carried by a vertically disposed shaft 49.

Figure 3:
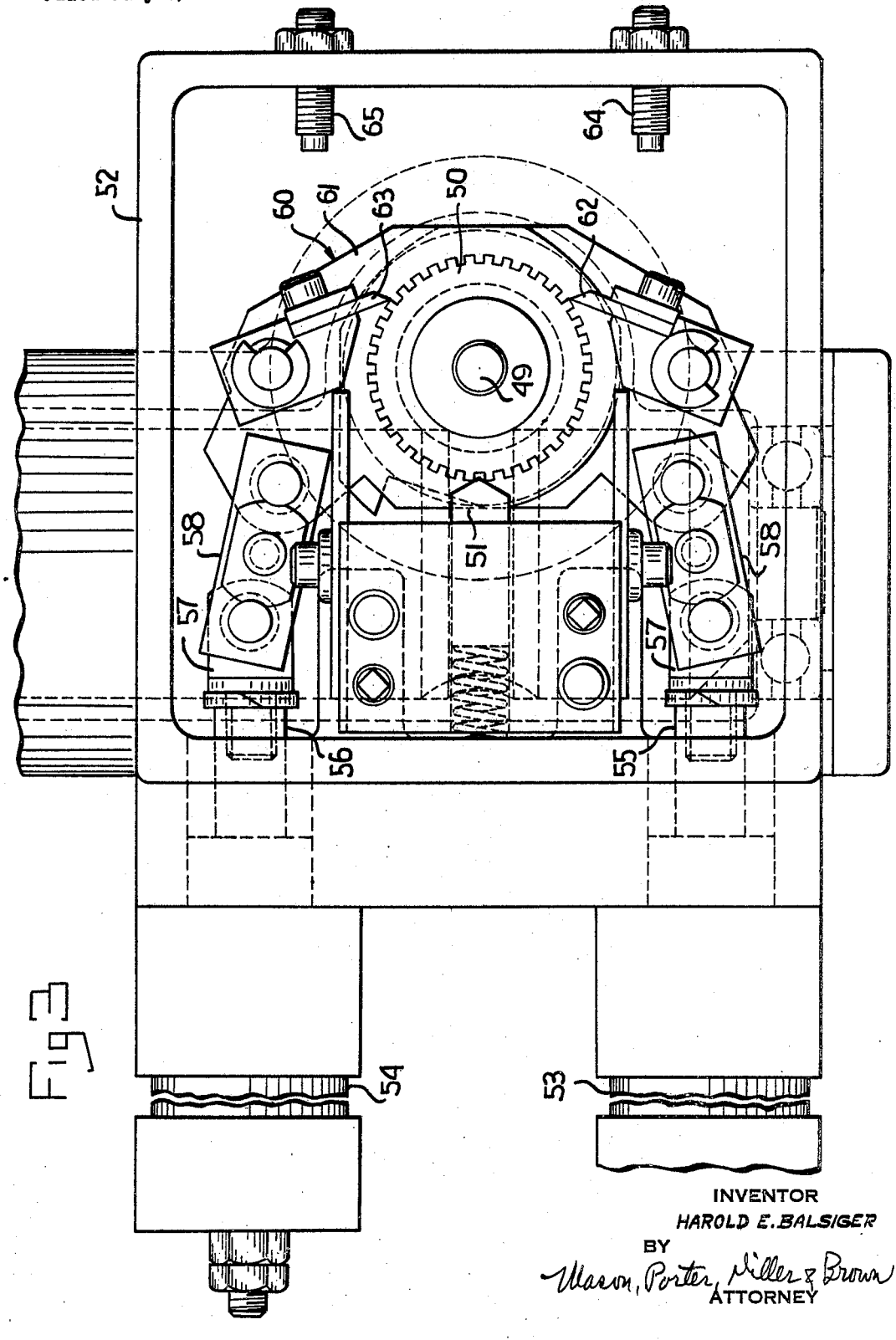
FIGURE 3 is a plan view of a pawl and ratchet mechanism for actuating the grinding wheel support adjusting means.

Referring now to FIGURE 3 in particular, it will be seen that the shaft 49 is provided at one end with a ratchet wheel 50. A spring loaded detent 51 constantly engages the ratchet wheel 50 to retain it in an adjusted position.

A housing 52 generally surrounds the ratchet wheel 50 and has a pair of fluid cylinders 53 and 54 supported thereby in projecting relation. The fluid cylinders 53 and 54 supported thereby in projecting relation. The fluid cylinders 53 and 54 have piston rods 55 and 56, respectively projecting into the housing 52 and carrying fittings 57. To the fittings 57 there are pivotally connected links 58 which are, in turn, connected to a ratchet mechanism, generally referred to by the numeral 60. The ratchet mechanism 60 includes a plate 61 directly connected to the links 58. The plate 61 has mounted thereon a pair of pawls 62 and 63 for engaging the ratchet wheel 50 to effect the rotation thereof.

This housing 52 also carries adjustable stop members 64 and 65 for limiting the pivotal movement of the plate 61 on each actuation thereof.

OPERATION

Assuming that the grinding wheel 17 has been properly angularly positioned and grinding of the seating surfaces of valves have taken place, after one or more dressing operations, a countercontact STR1 closes and relay 38CR is energized. A normally open contact 38CR1 closes in a circuit through a normally closed contact 40CR1 to energize swivel relay 37CR.

Normally open contacts 37CR2 and 37CR3 close to energize a valve solenoid 75. The energization of the valve solenoid 75 shifts a swivel pilot valve 72 to the right, cutting off the supply of fluid pressure to the left-hand end of a swivel valve piston 73. This permits constant fluid pressure on the right side of piston 73 to move the piston 73 to the left to shift a valve 74 connected to the piston 73 to the left and to direct fluid under pressure to the swivel feed cylinder 53 to cause an increment of swivel movement of base 13 in a counterclockwise direction to adjust the angular position of the grinding wheel 17 to maintain the relationship of the face of the grinding wheel 17 with respect to the valves 24 in accordance with the reduced diameter of the grinding wheel 17 so as to maintain the seating surfaces 25 of the valves 24 at a predetermined angle.

It is to be understood that after each energization of the circuit relay 37CR, the circuit thereto is broken by opening of counter contact CTR1 with the result that the solenoid 75 is returned to its normal position by means of a built-in spring return mechanism. This cycle of operation is repeated until the grinding wheel 17 is worn to a predetermined diameter. Each time the grinding wheel support 16 is retracted it will close a limit switch 9LS. The limit switch 9LS is in a circuit including a circuit relay 41CR. The circuit to the circuit relay 41CR may be completed by the actuation of a push button switch PBS1. At this time, contact 41CR1 closes in the circuit to swivel reset relay 40CR. At this time it is pointed out that there is also in the circuit to the relay 40CR a normally open contact 42CR2 which is closed at the beginning of the swivel movement when relay 42CR is energized by the closing of normally closed limit switch 45LS after the first swivel adjustment with a new grinding wheel. The circuit to the relay 40CR also includes a normally closed contact 37CR1 which keeps the relay 40CR de-energized when the swivel feed relay 37CR is energized.

When the relay 40CR is energized, normally closed contact 40CR1 opens in the circuit to relay 37CR. At the same time, normally open contacts 40CR2 and 40CR3 close to energize a reset solenoid 76 which shifts a reset pilot valve 77 to the right, cutting off the supply of fluid under pressure to the left-hand end of reset valve piston 78, and permitting constant pressure on the right-hand side of reset valve piston 78 to shift an associated reset valve 80 to the left to direct fluid under pressure to the left end of the cylinder 54, which is the reset cylinder, to actuate the pawl assembly in a clockwise direction, turning the ratchet wheel 50 in a clockwise direction until the wheel suport 16 is returned in a clockwise direction to its starting position.

When the wheel support 16 is in its starting position, the limit switch 45LS is opened to de-energize relay 42CR. At this time contact 42CR1 opens in the circuit to the reset relay 40CR, stopping the swivel reset movement of the wheel support 16. At this time, the grinding wheel 17 is replaced by a new grinding wheel of the original diameter and the grinding machine 10 is now ready for a new sequence of operations.

Although only a preferred embodiment of the invention has been specifically illustrated and described herein, it is to be understood that minor variations may be made in the disclosed grinding machine without departing from the spirit and scope of the invention, as defined in the appended claims.

I claim:

1. In a machine for grinding a workpiece having a conical surface,
   (a) a grinding wheel having a cylindrical surface for engaging and grinding a workpiece conical surface,
   (b) work support means for supporting a workpiece for rotation about a fixed axis concentric with the conical surface thereof and for engagement with said grinding wheel at a point of intersection lying in a plane containing the axis of rotation of said grinding wheel,
   (c) said workpiece axis of rotation being disposed in angular relation to said plane,
   (d) the angular relation of said workpiece axis of rotation to said plane being subject to change corresponding to change in the diameter of said grinding wheel due to wear and dressing, whereby the surface of the grinding wheel and the contacted portion of the conical surface of the workpiece cease to be parallel,
   (e) means for maintaining a parallel relation between the grinding wheel surface and a workpiece conical surface at the point of contact therebetween comprising
   (f) a pivotally mounted support for said grinding wheel,
   (g) and means for pivoting said grinding wheel an amount corresponding to the change in diameter of the grinding wheel.

2. The machine of claim 1 wherein
   (a) the pivoting of said grinding wheel support is about an axis lying in a plane passing through said workpiece axis of rotation and normal to a plane passing through the axis of said grinding wheel and parallel to said workpiece axis of rotation.

3. In a machine for grinding workpieces having a conical surface,
   (a) a grinding wheel for engaging and grinding said conical surface,
   (b) a work support for rotatably supporting a workpiece for engagement with said grinding wheel at a point other than the point of intersection between the surface of said grinding wheel and a horizontal plane through the axis of said grinding wheel,
   (c) pivotally mounted support means for said grinding wheel for maintaining a substantially constant angular relation between said grinding wheel face and said conical surface,
   (d) and means operable at intervals as the grinding wheel becomes smaller for actuating said means to compensate for the change in diameter of the grinding wheel.

4. The machine of claim 3 wherein said means for pivoting said grinding wheel includes
   (a) incremental means for moving said wheel support about said pivot,
   (b) and means operable at intervals as the grinding wheel becomes smaller for actuating said incremental means an amount corresponding to the change in diameter of the grinding wheel.

5. The machine of claim 3 wherein
   (a) the vertical position of the line of contact between said grinding wheel and said conical surface being subject to change corresponding to change in diameter of said grinding wheel due to wear and dressing, whereby the distance between the point of contact of the grinding wheel and the conical surface and the horizontal plane passing through the axis of the workpiece changes progressively as the diameter of the grinding wheel decreases, and the surface of the grinding wheel and the conical surface of the workpiece ceases to be parallel,
   (b) and the means for maintaining the substantial constant angular relation between said grinding wheel face and said conical surface also maintaining a parallel relation between said grinding wheel face and said contact surface.

6. In a grinding machine for grinding workpieces having a conical surface,
   (a) a grinding wheel support,
   (b) a grinding wheel rotatably mounted on said wheel support for engaging and grinding said conical surface,
   (c) a work support for rotatably supporting a workpiece in engagement with said grinding wheel about an axis in a plane other than a plane containing the axis of said grinding wheel,
   (d) one of said supports being pivotally mounted for swivelling in a horizontal plane,
   (e) means for moving said support about said pivot in accordance to the change in said wheel diameter,
   (f) and control means operable at intervals as said grinding wheel becomes smaller to maintain a parallel relation between said conical surface and the operative surface of said grinding wheel.

7. A machine for simultaneously grinding conical faces of two poppet valves to a predetermined angle comprising
   (a) two valve support means for separately supporting a valve for rotation about an angularly fixed axis, the axes of said valve support means being in spaced parallel relation,
   (b) and a single grinding wheel,
   (c) said grinding wheel has an axis lying in a plane disposed parallel to said two axes and passing therebetween,
   (d) and grinding wheel support means mounted for pivotal movement to shift the axis of said grinding wheel as said grinding wheel becomes smaller due to wear and dressing to continue to grind the same angle face on all valves.

8. The machine of claim 7 wherein
(a) the angle between the axis of said grinding wheel and the axis of each valve support means is always different from the angle of the surface being ground.

9. The machine of claim 7 wherein
(a) said valve support means are fixed,
(b) and said grinding wheel suport means have means for shifting the axis of said grinding wheel in said plane towards a plane passing through said valve support means axes as said grinding wheel becomes smaller due to wear and dressing.

10. In a machine for grinding a workpiece where the relation between the surface of the grinding wheel and the surface of the workpiece being ground changes as the grinding wheel becomes smaller in diameter, a grinding wheel for engaging and grinding said workpiece surface, a work support for rotatably supporting a workpiece for engagement with said grinding wheel at a point other than the point of intersection between the surface of said grinding wheel and a horizontal plane through the axis of said grinding wheel, the axis of rotation of said workpiece being at an angle to the axis of rotation of said grinding wheel, means for maintaining a substantially constant relation between said grinding wheel face and said workpiece surface including a pivotally mounted support for said grinding wheel, and means operable as said grinding wheel becomes smaller for shifting said pivotally mounted support to compensate for change in diameter of said grinding wheel.

11. A machine for simultaneously grinding conical faces of two poppet valves to a predetermined angle comprising
(a) two valve support means for separately supporting a valve for rotation about an angularly fixed axis, the axes of said valve support mens being in spaced parallel relation,
(b) a single grinding wheel,
(c) said grinding wheel has an axis lying in a plane disposed parallel to said two axes and passing therebetween,
(d) and said grinding wheel lying in a plane disposed at an agle other than 90 degrees to the axes of said valve support means.

References Cited
UNITED STATES PATENTS

| | | | |
|---|---|---|---|
| 1,949,345 | 2/1934 | Asbridge | 51—105 X |
| 1,991,724 | 2/1935 | Binns | 51—105 X |
| 2,054,985 | 9/1936 | Kraemer. | |
| 2,778,163 | 1/1957 | Flygare | 51—105 X |
| 2,806,327 | 9/1957 | Coburn | 51—33 |

HAROLD D. WHITEHEAD, Primary Examiner

U.S. Cl. X.R.

51—165